Figure 1:
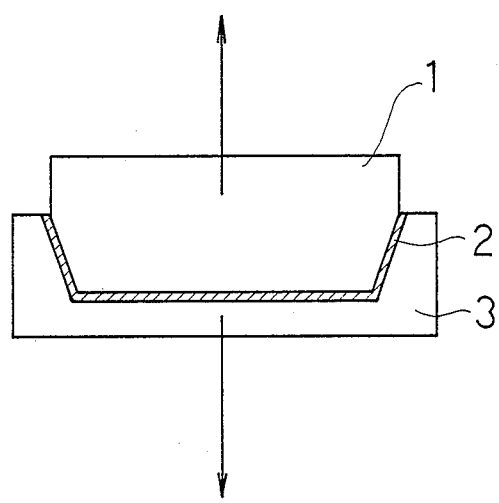

United States Patent [19]

Fukui et al.

[11] Patent Number: 4,840,675
[45] Date of Patent: Jun. 20, 1989

[54] MOLD RELEASE COMPOSITION

[75] Inventors: Shosin Fukui, Toyonaka; Masayoshi Shinjo, Settsu; Hirokazu Aoyama, Osaka, all of Japan

[73] Assignee: Daikin Kogyo Co., Ltd., Osaka, Japan

[21] Appl. No.: 249,191

[22] Filed: Sep. 26, 1988

Related U.S. Application Data

[60] Continuation of Ser. No. 936,940, Dec. 1, 1986, abandoned, which is a continuation of Ser. No. 785,646, Oct. 9, 1985, abandoned, which is a division of Ser. No. 627,577, Jul. 3, 1984, abandoned.

[51] Int. Cl.$^4$ ............................................. B28B 7/36
[52] U.S. Cl. ............................... 106/38.22; 264/130; 264/264; 264/300; 264/338
[58] Field of Search ................ 106/38.22; 264/130, 264/338, 264, 300

[56] References Cited

U.S. PATENT DOCUMENTS 3,398,182  8/1968  Guenthner et al. ............... 106/2
3,484,281  12/1961 Guenthner et al. ............. 428/425.1
4,184,880  1/1980  Huber et al. .................... 106/38.24

Primary Examiner—Theodore Morris
Attorney, Agent, or Firm—Armstrong, Nikaido, Marmelstein, Kubovcik & Murray

[57] ABSTRACT

A process for imparting releasing property to a mold which comprises applying to the mold a composition comprising:
(A) (1) a fluorine-containing urethane compound represented by the formula

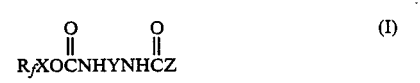

and/or
(2) a fluorine-containing urethane compound represented by the formula

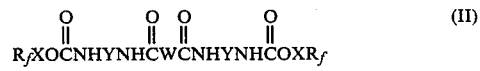

and/or
(3) a fluorine-containing urethane compound represented by the formula

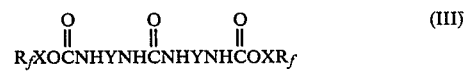

and
(B) at least one of members selected from the class consisting of silicone oil, silicone varnish, wax and a highly fluorinated organic compound and the mold release composition used for the process.

7 Claims, 1 Drawing Sheet

MOLD RELEASE COMPOSITION

This application is a continuation of application Ser. No. 936,940 filed Dec. 1, 1986 which in turn is a continuation of application Ser. No. 785,646 filed Oct. 9, 1985 which is a divisional of application Ser. No. 627,577 filed July 3, 1984. Each of the prior applications is now abandoned.

This invention relates to a process for imparting releasing property to a mold, a mold release composition and more particularly to a mold release composition for use in the production of molded articles such as of polymeric materials including synthetic resins and rubbers, and foamed products thereof.

It is well known to use as a mold release agent natural or synthetic compounds such as silicone oil, mineral oils, paraffin waxes, aliphatic acid derivatives glycols, etc., or inorganic substances such as talc, mica, etc., in the production of molded articles of cements, ceramics, polymeric materials or the like. In general, these mold release agents are applied to a mold prior to introduction of the material to be molded. When the lifetime of a mold release agent is short, the release agent is usually applied prior to each cycle in which a material is introduced to be molded. Silicone oil is most widely employed as a mold release agent due to its excellent releasing property. In the case, however, when a material having a strong adhering tendency, for example, urethane or epoxy resin, is to be molded, it is necessary to employ silicone oil in conjunction with fine powder of silicon oxide so as to improve mechanical strength of the film of the mold release agent and, moreover, it is required to apply them to the mold in a large amount. The application of the mold release agent in such a large amount leads to transfer of the mold release agent to molded article. This makes impossible the aftertreatments of the surfaces of the molded articles, e.g., a coating or adhering treatment, and is undesirable from a viewpoint of material cost.

Further, the application of the mold release agent in a large amount causes accumulation of sediments of the mold release agent or molded material on the surface of the mold during repetition of the cycle of molding. Thus, it is required to wash the mold which frequently results in reduction of molding efficiency.

Certain of fluorine-containing compounds are known to have a mold release ability because of their low surface energy. A mold release composition comprising a phosphoric acid ester of perfluoroalkyl group-containing alcohol and an additive such as silicone oil has been developed in Japanese Examined Patent Publication No. 23271/1978 as a mold release agent which has good mold release ability.

However, the mold release composition comprising such a perfluoroalkyl group-containing phosphoric acid ester, which has a reactive functional group, partly reacts with the surface of the polymeric materials during the molding operation to spoil the surface of the molded articles.

We have conducted extensive research to overcome the drawbacks to the foregoing conventional mold release compositions and found that a mold release composition comprising a urethane compound having perfluoroalkyl in the molecule and at least one of silicone oil, silicone varnish, wax and a highly fluorinated organic compound is excellent in preventing the molded piece from sticking to the mold, gives the molded piece improved surface characteristics and exhibits good mold release ability whether it is applied to a metal mold or resin mold.

It is, accordingly, an object of the present invention to provide a mold release composition which can exhibit improved mold release properties.

Another object of the present invention is to provide a mold release composition having a prolonged mold release lifetime.

A further object of the invention is to provide a process for imparting releasing property to a mold.

Other objects, features and advantages of this invention will become more apparent from the detailed description to follow.

The present invention provides a mold release composition comprising:

(A) (1) a fluorine-containing urethane compound represented by the formula

wherein $R_f$ represents a perfluoroalkyl group having 4 to 20 carbon atoms, X represents a methylene group, $-CH_2CH(A)C_mH_{2m}-$ or $-SO_2N(R)C_tH_{2t}-$, A represents a hydrogen atom, lower alkyl group, hydroxyl group or lower alkylcarbonyloxy group, m is an integer of 0 to 4; and R represents a lower alkyl group, t is an integer of 1 to 4, Y represents a divalent organic group and Z represents a monohydric organic group, and/or (2) a fluorine-containing urethane compound represented by the formula

wherein $R_f$, X and Y are as defined above and W represents a divalent organic group, and/or (3) a fluorine-containing urethane compound represented by the formula

wherein $R_f$, X and Y are defined above, and (B) at least one of members selected from the class consisting of silicone oil, silicone varnish, wax and a highly fluorinated organic compound, and provides a process for imparting releasing property to a mold with use of the mold release composition as above defined.

The mold release composition of the present invention exhibits a remarkable mold release ability even when applied in a small amount to the surface of the mold and is less tending to render the surface of the molded piece sticky and stained.

The fluorine-containing urethane compound has as high order of releasing property as silicone oil or higher than silicone oil.

The fluorine-containing urethane compound (I) to be used in the present invention can be prepared, for example, by mixing 1 mole of a fluorine-containing alcohol with 1 mole of a diisocyanate compound, heating the mixture in the presence or absence of triethylamine or like catalyst, and adding to the reaction mixture 1 mole of a specific type of alcohol, amine or carboxylic acid compound, as disclosed in U.S. Pat. Nos. 3398182 and 3483281 and other literature. When required, the compound (I) can be produced similarly by adding 2 moles of the fluorine-containing alcohol per mole of the diisocyanate compound. The groups represented by $R_f$, X, Y and Z are determined depending on the structures of the starting materials.

The fluorine-containing alcohols useful in the process of the present invention includes a wide variety of those heretofore known, such as

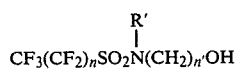

wherein n is an integer of 3 to 9, n' is 1 or 2, R' is —CH$_3$ or —C$_2$H$_5$, CF$_3$(CF$_2$)$_n$(CH$_2$)$_{n'}$OH wherein n is an integer of 7 to 12 and n' is 1 or 2,

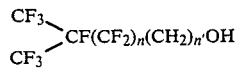

wherein n is an integer of 7 to 12 and n' is 1 or 2, etc.

Useful diisocyanate compounds can be extensively selected from those heretofore known and including

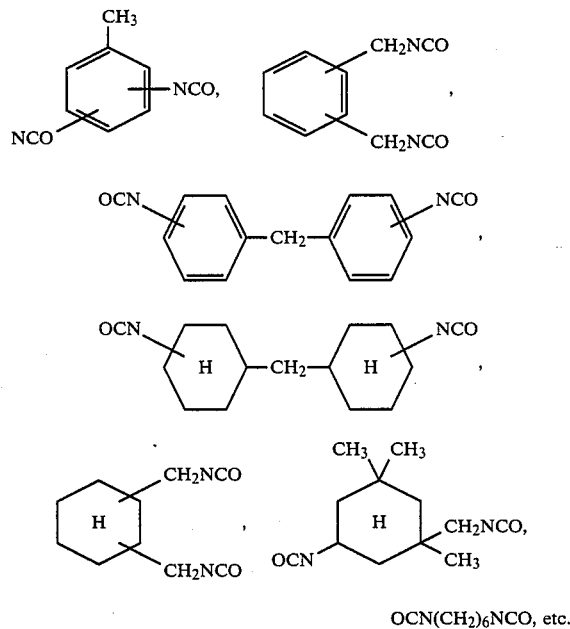

OCN(CH$_2$)$_6$NCO, etc.

The residue resulting from the reaction of the dissocyanate compound as used is the divalent organic group represented by Y.

Useful alcohol, amine and carboxylic acid compounds include a broad range of those heretofore known, such as

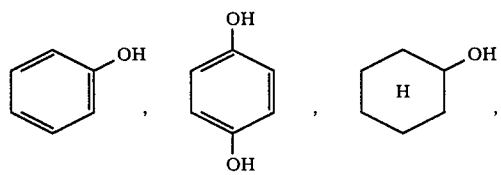

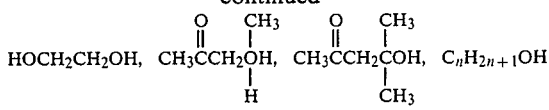

wherein n is an integer of 1 to 7, C$_n$H$_{2n+1}$O(CH$_2$)$_{n'}$OH wherein n is an integer of 1 to 4 and n' is an integer of 2 to 4,

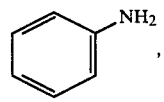

C$_n$H$_{2l}$NH$_2$ wherein n is an integer of 1 to 3,

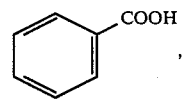

C$_n$H$_{2n+1}$COOH wherein n is an integer of 1 to 3, etc. The residue resulting from the reaction of one of these compounds is the monohydric organic group represented by Z.

The isocyanate groups remaining in the reaction product of the fluorine-containing alcohol and the diisocyanate compound are reacted with the alcohol, amine or carboxylic acid compound to give a fluorine-containing urethane compound having a bonding group

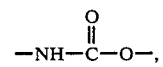

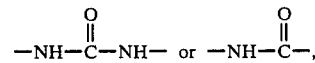

respectively. The compounds thus obtained can be used as the active component (A).

The fluorine-containing urethane compound (II) which can be used in this invention can be prepared, for example, by reacting the reaction product resulting from the reaction in the first step of the process for preparing the compound (I) with a compound having two hydroxyl and/or amino groups as the functional groups. Useful compounds having such functional groups can be extensively selected from those heretofore known and including HO(CH$_2$)$_k$OH wherein k is an integer of 2 to 6, HO(CH$_2$)$_k$NH$_2$ wherein k is an integer of 2 to 6, H$_2$N(CH$_2$)$_k$NH$_2$ wherein k is an integer of 2 to 6,

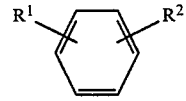

wherein R$^1$ and R$^2$ are the same or different and are each a hydroxyl group, amino group or lower alkyl group having hydroxyl or amino group,

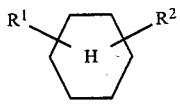

wherein R¹ and R² are as defined above, etc. The residue resulting from the reaction of these compounds is the divalent organic group represented by W.

The fluorine-containing urethane compounds (III) to be used in the present invention are novel compounds which are undisclosed in literature and can be prepared, for example, by reacting water with the reaction product after completion of the reaction in the first step of the process for preparing the compound (I). The reaction between the reaction product in the first step and water is conducted preferably in the same manner as the preceding reaction without isolating the reaction product from the reaction mixture, and is usually effected by adding a specific amount of water after completion of the reaction in the first step. Alternatively the reaction product isolated from the reaction mixture can be reacted with water. The amount of water to be added is about 0.4 to about 0.6 mole, preferably about 0.5 mole, per mole of the reaction product obtained in the first step.

As the silicone varnish may be used any of those heretofore known such as methyl silicone varnish. Methyl silicone varnish is a three dimensional network copolymer comprising a various combination of structural unit, such as $SiO_2$, $CH_3SiO_{3/2}$, $(CH_3)_2SiO$ and $(CH_3)_3SiO_{1/2}$. The copolymer may contain cross-linkable group such as hydroxy group. Most preferably is a silicone varnish soluble in an organic solvent.

The highly fluorinated organic compound means a compound in which hydrogen atoms capable of being fluorinated are highly fluorinated and which has a boiling point not lower than 100° C. Such compounds include highly fluorinated alkyl compounds such as $H(CF_2CF_2)_nCF_3$, $[(CF_{32}CF(CF_2)_n]_2$, $Cl(CF_2CF_2)_nCHF_2$, etc., wherin n is an integer of 1 to 15, inner olefins and derivatives thereof such as hexafluoropropene oligomers, polyethers such as hexafluoropropylene oxide, tetrafluoroethylene oxide, etc., and highly fluorinated amines such as $(C_4F_9)_3N$. Examples of suitable highly fluorinated organic compounds include $(CF_3)_2CF(CF_2)_4CF(CF_3)_2$ (b.p. 207° C.), $CF_3(CF_2)_4CCl_3$ (b.p. 143° C.), $Cl(CF_2CFCl)_3Cl$ (b.p. 203° C.), $C_2F_5CFClCF_2CFCl_2$ (b.p. 119° C.), $C_9F_{20}$ (b.p. 125° C.), $C_9HF_{19}$ (b.p. 138° C.), $CF_2Cl(CF_2)_5CHF_2$ (b.p. 123° C.), $CHF_2(CF_2)_7CF_2Cl$ (b.p. 162° C.), $C_{11}HClF_{22}$ (b.p. 191° C.),

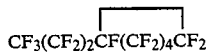

(b.p. 123°-126° C.),

(b.p. 225° C.), hexafluoropropene trimer (b.p. 110°-114° C.), tetrafluoroethylene pentamer (b.p. 130°-132° C.), perfluorodecalin (b.p. 142° C.), perfluorobutyltetrahydrofuran (b.p. 102° C.), $F[CF(CF_3)CF_2O]_4CHFCF_3$ (b.p. 193° C.), $(C_4F_9)_3N$ (b.p. 174° C.), etc. Most of the above-mentioned compounds are liquid at a normal temperature and some of them are solid. All of the compounds have melting points below 150° C.

The waxes usable in the present invention include animal and vegetable waxes conventionally used as well as mineral or synthetic waxes such as paraffin wax. The waxes preferably usable in the present invention are vegetable waxes composed of aliphatic acid esters such as carnauba wax, candelilla wax, etc., mineral waxes such as polyethylene wax, micro wax, FT wax, etc., and animal waxes such as wool wax, bees wax, etc. These waxes may be used singly or in combination of two or more waxes.

The silicone oil, silicone varnish, highly fluorinated compound and wax may be used in wide ranges of amounts and, preferably, in the range of 0.1 to 10 parts of weight, most preferably 0.3 to 5 parts by weight, per part by weight of the fluorine-containing urethane compound.

In addition to the above additives, the mold release composition of the present invention may be added, if preferred, with any of ordinarily employed anionic, cationic and nonionic surface active agents to improve stability and wettability of the composition or powder of fluororesin, fluorinated carbon, aluminum, copper, mica, etc. to improve releasability and lubricating property.

The fluorine-containing urethane compound in the process or the mold release composition of the present invention may be used in a form of solution or dispersion in a liquid medium such as an organic solvent or an aqueous medium. The organic solvent usable as the liquid medium in the present invention are, for example, alcohols such as methanol, ethanol, propanol, isopropanol, etc., ketones such as acetone, methyl ethyl ketone, methyl isobutyl ketone, etc., ethers such as ethyl ether, isopropyl ether, dioxane, tetrahydrofuran, etc., esters such as ethyl acetate, butyl acetate, etc., hydrocarbons such as toluene, xylene, etc., halogenated hydrocarbons such as carbon tetrachloride, methylene chloride, ethylene chloride, trichloroethylene, perchloroethylene, trichloroethane, trichlorofluoromethane, tetrachlorodifluoroethane, trichlorotrifluoroethane, etc. These organic solvents may be used singly or in combination.

The fluorine-containing urethane compound in the process or the mold release composition of the present invention can be prepared as follows.

When an organic solvent is used as the liquid medium, the fluorine-containing urethane compound is dissolved in a solvent such as trichlorotrifluoroethane and other additives such as silicone oil, silicone varnish, wax and highly fluorinated organic compounds are dissolved in a solvent such as toluene or xylene, and both solutions are mixed to produce the composition. Aqueous dispersion of the fluorine-containing urethane in the process or the mold release composition of the invention can be prepared by dispersing the fluorine-containing urethane compound in water with use of a cationic-, anionic- or nonionic surface active agent and, if necessary, then mixing therewith a dispersion of additive such as silicone oil similarly prepared.

The concentration of the fluorine-containing urethane compound in the process or the mold release agent (i.e., a total concentration of the fluorine-containing urethane compound and at least an additive selected from a silicone oil, a silicone varnish, a wax and a highly fluorinated compound) in the mold release composition generally ranges from 0.1 to 50% by weight. For only one cycle of molding operation, a concentration of 0.1 wt. % or less is sufficient. Where a long lifetime is required of a single application of the mold release agent, the concentration is preferably in the range of 0.5 to 20 wt. %, more preferably 1 to 10 wt. %.

Examples of molding materials to which the fluorine-containing urethane compound in the process or the mold release composition of the present invention is suitably applicable include synthetic resins or rubbers such as polyurethane, chloroprene rubber, polycarbonate, fluorine-contained rubber, epoxy resin, phenolic resin, vinyl chloride resin, etc., and a variety of natural resins and natural rubber and foaming materials thereof. In the case when polyurethane foam is to be molded, the application of the known mold release agent causes reduction of mold releasability or spoiling of the surface of the molded product because of the reaction of the reactive isocyanate group of the polyurethane with the functional group of the mold release agent. The mold release composition of the present invention is free from such drawbacks since the functional group is previously removed therefrom by a reaction as apparent from the synthesis process of the urethane compound.

Application of the solution or dispersion of the fluorine-containing compound or the mold release composition to mold is feasible by conventional methods. For example, it is sufficient to apply the mold release composition of the invention to a mold by immersion, spraying, brushing or rubbing with impregnated cloth, and then to remove the liquid medium by evaporation. The evaporation can be omitted for some of the molding materials, but for molding urethane resin the liquid medium must be completely removed by evaporation.

The present invention will be described below in detail with reference to the following Reference Example, Examples and Comparison Examples in which the parts and percentages are all by weight.

REFERENCE EXAMPLE

A 500-cc, 4-necked flask equipped with a dropping funnel having a pressure balancing tube, a thermometer, a nitrogen tube and a magnetic stirrer was set on a silcone oil bath. In the flask were placed 17.4 g (0.1 mole) of 2,4-tolylenediisocyante and 200 g of methyl ethyl ketone. The mixture was stirred while forcing nitrogen into the flask through the nitrogen tube. The feed of nitrogen was ceased in 15 minutes and the nitrogen tube was replaced by a condenser and the liquid was maintained at a temperature of 75° C. A 51.4 g (0.1 mole) quantity of

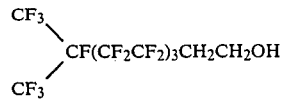

was added dropwise over 45 minutes through the dropping funnel under dry nitrogen atmosphere. After completion of the addition, the mixture was stirred for 30 minutes and 0.9 g (0.05 mole) of water was added, followed by stirring for 3 hours. The reaction mixture was withdrawn and the methyl ethyl ketone (solvent) was distilled in an evaporator. Vacuum drying gave 64 g of a white solid having a melting point of 85° C. The solid was analyzed by gas chromatography and infrared absorption spectrum and the contemplated compound of the formula

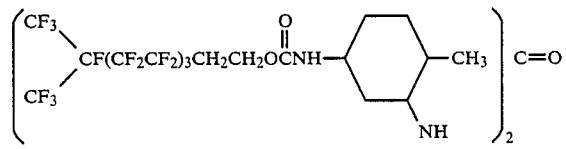

was found to have a selectivity of 98%. The compound was afforded in 95% yield based on the starting material 2,4-tolylenediisocynate.

EXAMPLES 1 TO 38 AND COMPARISON EXAMPLES 1 TO 7

1. Purpose

Various mold release compositions were subjected to tests using molded products of hard urethane foam and those of epoxy resin to determine the mold release ability of the compositions.

2. Mold release compositions as used (A) Fluorine-containing urethane compounds

Fourteen kinds of compounds as listed in Table 1 below were used in the tests.

TABLE 1

| | Fluorine-containing urethane compounds | | | |
|---|---|---|---|---|
| | $R_fXOCNHYNHCZ$ with two C=O groups | | | Formula (I) |
| | $R_fXOCNHYNHCWCNHYNHCOXR_f$ with four C=O groups | | | Formula (II) |
| | $R_fXOCNHYNHCNHYNHCOXR_f$ with three C=O groups | | | Formula (III) |
| No. | Formula | $R_fX$ | Y | Z or W |
| 1 | (I) | $C_8F_{17}CH_2CH_2-$ | —⟨C₆H₄⟩—CH₃ | —OCH₃ |
| 2 | (I) | $C_8F_{17}SO_2NCH_2CH_2-$ with $CH_3$ | —⟨C₆H₄⟩—CH₃ | —OCH₃ |

TABLE 1-continued

Fluorine-containing urethane compounds $$R_fXOCNHYNHCZ \quad \text{Formula (I)}$$
(with two C=O groups)

$$R_fXOCNHYNHCWCNHYNHCOXR_f \quad \text{Formula (II)}$$
(with four C=O groups)

$$R_fXOCNHYNHCNHYNHCOXR_f \quad \text{Formula (III)}$$
(with three C=O groups)

| No. | Formula | R$_f$X | Y | Z or W |
|---|---|---|---|---|
| 3 | (I) | (CF$_3$)$_2$CF(CF$_2$CF$_2$)$_3$CH$_2$CH$_2$— | 2,4-dimethylphenylene (–C$_6$H$_3$(CH$_3$)–) | —OCH$_3$ |
| 4 | (I) | (CF$_3$)$_2$CF(CF$_2$CF$_2$)$_n$CH$_2$CH$_2$— (i) | –C$_6$H$_4$–CH$_2$–C$_6$H$_4$– | —O–C$_6$H$_5$ |
| 5 | (I) | (CF$_3$)$_2$CF(CF$_2$CF$_2$)$_n$CH$_2$CH$_2$— (i) | –C$_6$H$_{10}$–CH$_2$–C$_6$H$_{10}$– | —O–C$_6$H$_5$ |
| 6 | (I) | (CF$_3$)$_2$CF(CF$_2$CF$_2$)$_n$CH$_2$CH$_2$— (i) | isophorone diisocyanate residue (trimethylcyclohexyl–CH$_2$–) | —OC$_2$H$_5$ |
| 7 | (I) | (CF$_3$)$_2$CF(CF$_2$CF$_2$)$_n$CH$_2$CH$_2$— (i) | —H$_2$C–C$_6$H$_4$–CH$_2$— | —OC$_4$H$_9$ |
| 8 | (I) | (CF$_3$)$_2$CF(CF$_2$CF$_2$)$_n$CH$_2$CH$_2$— (i) | 2,4-dimethylphenylene | —O–C$_6$H$_5$ |
| 9 | (I) | (CF$_3$)$_2$CF(CF$_2$CF$_2$)$_n$CH$_2$CH$_2$— (i) | 2,4-dimethylphenylene | —OCH$_2$CH$_2$(CF$_2$CF$_2$)$_n$CF(CF$_3$)$_2$ (ii) |
| 10 | (I) | (CF$_3$)$_2$CF(CF$_2$CF$_2$)$_n$CH$_2$CH$_2$— (i) | 2,4-dimethylphenylene | —N(C$_2$H$_5$)$_2$ |
| 11 | (II) | C$_8$F$_{17}$CH$_2$CH$_2$— | 2,4-dimethylphenylene | —NHCH$_2$CH$_2$O— |

TABLE 1-continued

Fluorine-containing urethane compounds $$R_fXOCNHYNHCZ \quad \text{(with two C=O groups)} \qquad \text{Formula (I)}$$

$$R_fXOCNHYNHCWCNHYNHCOXR_f \qquad \text{Formula (II)}$$

$$R_fXOCNHYNHCNHYNHCOXR_f \qquad \text{Formula (III)}$$

| No. | Formula | R$_f$X | Y | Z or W |
|---|---|---|---|---|
| 12 | (II) | C$_8$F$_{17}$SO$_2$NCH$_2$CH$_2$—<br>\|<br>CH$_3$ | —⬡—CH$_2$—⬡— | —O—⬡—O— |
| 13 | (II) | CF$_3$<br>  \<br>   CF(CF$_2$CF$_2$)$_n$CH$_2$CH$_2$—<br>  /<br>CF$_3$    (i) | —⬡—CH$_3$ | —OCH$_2$CH$_2$O— |
| 14 | (III) | CF$_3$<br>  \<br>   CF(CF$_2$CF$_2$)$_n$CH$_2$CH$_2$—<br>  /<br>CF$_3$    (i) | —⬡—CH$_3$ | — |

NOTE

The proportions of the groups (i) and (ii) are 55 mole % when n is 3; 28 mole % when n is 4; 11 mole % when n is 5; 4 mole % when n is 6; and 1 mole % when n is 7.

When used as the component for a solution-type mold release composition the fluorine-containing urethane compound listed in Table 1 was dissolved in 1,1,2-trichloroethane or like solvent before use.

When used as the component for an aqueous-type mold release composition the fluorine-containing urethane compounds listed in Table 1 were further treated as follows: 10 parts of the urethane compound was dissolved in 15 parts of methyl ethyl ketone and the solution was stirred by a high-speed homogenizer together with 0.4 part of NINION HS 240 (nonionic surfactant, product of Nippon Yushi Kabushiki Kaisha) and 74.4 parts of water for 30 minutes to give a milk white emulsion, which was diluted with water before use.

(B) Other components than the fluorine-containing urethane compound

| Name of Additive | Trade Name | Composition | Producing Company |
|---|---|---|---|
| a | Silicone SH 203 | methylalkylsiloxane oil | Toray Silicone Co. |
| b | Silicone 350 cs | dimethylsiloxane oil | Toray Silicone Co. |
| c | Silicone Emulsion SH 7036 | 35% aqueous emulsion of (b) | Toray Silicone Co. |
| d | Silicone KS 707 | silicone varnish | Shinetsu Silicone Co. |
| e | Carnauba wax | 10% toluene solution | — |
| f | Difloil | Cl(CF$_2$CFCl)$_{8-10}$Cl | Daikin |

| Name of Additive | Trade Name | Composition | Producing Company |
|---|---|---|---|
| | | | Kogyo Co. |

The components (A) and (B) are mixed in the proportions as shown in Table 2 below for the test using molded products of hard urethane foam and in Table 3 below for the test using molded products of epoxy resin. Comparision Examples involve the single use of the component A or B as listed in Tables 2 and 3 below.

3. Release tests with a hard urethane foam

| (1) Composition of the hard urethane foam | |
|---|---|
| Solution A | |
| Polyol PPG-SU-450L | 100 parts |
| (product of Mitsui Toatsu Kabushiki Kaisha) | |
| CCl$_3$F (blowing agent) | 44 parts |
| Triethylenediamine | 0.3 part |
| N,N—Dimethylethanolamine | 1.5 parts |
| L-5320 (foam-adjusting agent) | 1.5 parts |
| (product of Nippon Unitika Kaubushiki Kaisha) | |
| Solution B | |
| 4,4-Diphenylmethane diisocyanate | 115.4 parts |

(2) Test method

Referring to FIG. 1, a mold release composition 2 was brush-coated to an aluminum base mold 3 and air-dried. The solutions A and B were mixed together and stirred at a rotational speed of 1500 rpm and the reaction mixture was fed to the cavity of the base mold to give a foamed product which was then cured at room temperature of 25° C. The specimen thus obtained was left to stand for 30 minutes and tested for 90 tear test by using a tension tester (drawing speed: 200 mm/min) to determine the release ability. The values of the release ability as shown in Table 2 below are the mean values of three measurements.

4. Release tests with an epoxy resin
(1) Epoxy resin composition

TABLE 2

| | (A) Fluorine-containing urethane compound | | (B) Additive | | Solvent or dispersion medium | Test result Mold release ability (g/cm$^2$) |
|---|---|---|---|---|---|---|
| | Compound No. | Content in mold release comp. (%) | Kind | Content in mold release comp. (%) | | |
| Ex. No. | | | | | | |
| 1 | (1) | 0.7 | (b) | 0.3 | 1,1,2-Trifluoro-trichloroethane Methyl ethyl ketone | 268 |
| 2 | (1) | 0.3 | (f) | 0.7 | 1,1,2-trifluoro-trichloroethane Methyl ethyl ketone | 306 |
| 3 | (1) | 0.2 | (b) | 0.6 | Methyl ethyl ketone | 131 |
| | | | (d) | 0.2 | Toluene | |
| 4 | (4) | 0.2 | (b) | 0.6 | 1,1,2-Trifluoro-trichloroethane | 80 |
| | | | (d) | 0.2 | Methyl ethyl ketone | |
| 5 | (5) | 0.7 | (a) | 0.8 | 1,1,2-Trifluoro-trichloroethane | 247 |
| | | | (f) | 0.5 | Methyl ethyl ketone | |
| 6 | (6) | 0.1 | (d) | 0.9 | 1,1,2-trifluoro-trichloroethane Methyl ethyl ketone | 243 |
| 7 | (7) | 0.5 | (b) | 0.5 | 1,1,2-Trifluoro-trichloroethane Methyl ethyl ketone | 265 |
| 8 | (8) | 0.1 | (a) | 0.1 | 1,1,2-Trifluoro-trichloroethane | 294 |
| | | | (d) | 0.1 | Methyl ethyl ketone | |
| 9 | (8) | 0.1 | (b) | 0.3 | 1,1,2-Trifluoro-trichloroethane | 164 |
| | | | (e) | 0.1 | Tolune | |
| 10 | (10) | 0.8 | (c) | 0.8 | Water | 280 |
| 11 | (11) | 1.4 | (b) | 0.6 | 1,1,2-Trifluoro-trichloroethane Methyl ethyl ketone | 246 |
| 12 | (12) | 0.3 | (b) | 1.4 | 1,1,2-Trifluoro-trichloroethane | 72 |
| | | | (d) | 0.3 | Methyl ethyl ketone | |
| 13 | (13) | 0.2 | (a) | 0.5 | 1,1,2-Trifluoro-trichloroethane | 92 |
| | | | (d) | 0.3 | Methyl ethyl ketone | |
| 14 | (14) | 0.5 | (b) | 1.0 | 1,1,2-trifluoro-trichloroethane | 66 |
| | | | (d) | 0.5 | Methyl ethyl ketone | |
| 15 | (14) | 1.0 | (f) | 1.0 | 1,1,2-Trifluoro-trichloroethane | 263 |
| 16 | (14) | 1.0 | (c) | 1.0 | Water | 285 |
| 17 | (1) | 1.0 | — | — | 1,1,2-Trifluoro-trichloroethane Methyl ethyl ketone | 621 |
| 18 | (4) | 2.0 | — | — | 1,1,2-trifluoro-trichloroethane | 525 |
| 19 | (11) | 2.0 | — | — | Methyl ethyl ketone | 525 |
| 20 | (12) | 2.0 | — | — | Methyl ethyl ketone | 783 |
| 21 | (13) | 2.0 | — | — | Methyl ethyl ketone | 376 |
| 22 | (14) | 2.0 | — | — | Methyl ethyl ketone | 404 |
| Comp. Ex. No. | | | | | | |
| 1 | — | — | (b) | 2.0 | 1,1,2-trifluoro-trichloroethane | Broken |
| 2 | — | — | (d) | 1.0 | 1,1,2-Trifluoro-trichloroethane Toluene | 312 |
| 3 | — | — | (d) | 2.0 | 1,1,2-Trifluoro-trichloroethane | 306 |
| 4 | — | — | (f) | 2.0 | 1,1,2-Trifluoro-trichloroethane | Broken |

NOTE

The term "mold release composition" used herein refers to the whole composition containing a solvent or a dispersion medium.

| Solution A | |
|---|---|
| Epikote #828 (product of Shell International Chemicals Corp.) | 100 parts |
| Solution B | |
| Triethylenetetramine | 10 parts |

-continued (2) Test method

The mold release compositions were each applied onto an aluminum base mold of 10 cm x 10 cm in size by brushing and air-dried. Then, the solutions A and B were well mixed with each other. A chopstrain mat of glass fiber of 10 cm × 10 cm (product of Nitto-Spinning Co.) impregnated with the resulting solution was placed on the base mold on which an upper mold was placed and pressed. Then hardening of epoxy resin was effected by allowing to stand for a day at room temperature of 25° C. The specimen thus prepared was tested for 90° tear strength with use of a tension tester (drawing speed: 200 mm/min) to determine the release ability.

After single application of a mold release composition, the lifetime of the mold release composition was determined by repeating the cycle of the molding operation, without further application of the release composition, until the release ability decreased down. That is, mold release composition was first applied to the mold and then the molding operation was repeated without further application of the release composition as long as the molded articles can be released from the mold in a complete form. The lifetime was determined, which is shown by the number of the released molded articles released in a complete form. The values of the lifetime listed in Table 3 were each taken as an average value of three measurements obtained under the same conditions. The results are shown in Table 3.

TABLE 3

| | (A) Fluorine-containing urethane compound | | (B) Additive | | | Test result | |
|---|---|---|---|---|---|---|---|
| | Compound No. | Content in mold release comp. (%) | Kind | Content in mold release comp. (%) | Solvent or dispersion medium | Mold release ability (g/cm$^2$) | Life of mold release (cycle) |
| Ex. No. | | | | | | | |
| 23 | (2) | 0.5 | (b) | 1.0 | 1,1,2-Trifluoro-trichloroethane | 9 | 5 |
| | | | (d) | 0.5 | Toluene | | |
| 24 | (3) | 0.5 | (a) | 1.0 | 1,1,2-trifluoro-trichloroethane | 11 | 4 |
| | | | (e) | 0.5 | Toluene | | |
| 25 | (4) | 1.0 | (b) | 1.0 | 1,1,2-Trifluoro-trichloroethane Methyl ethyl ketone | 17 | 3 |
| 26 | (4) | 0.1 | (b) | 0.1 | 1,1,2-Trifluoro-trichloroethane | 14 | 3 |
| | | | (d) | 0.3 | Methyl ethyl ketone | | |
| 27 | (9) | 1.0 | (f) | 1.0 | 1,1,2-Trifluoro-trichloroethane Methyl ethyl ketone | 26 | 3 |
| 28 | (8) | 1.0 | (c) | 1.0 | Water | 19 | 3 |
| 29 | (11) | 0.5 | (b) | 1.0 | 1,1,2-trifluoro-trichloroethane | 6 | 5 |
| | | | (d) | 0.5 | Methyl ethyl ketone | | |
| 30 | (12) | 1.0 | (b) | 1.0 | 1,1,2-Trifluoro-trichloroethane Methyl ethyl ketone | 15 | 3 |
| 31 | (13) | 0.4 | (a) | 1.2 | 1,1,2-Trifluoro-trichloroethane | 9 | 3 |
| | | | (e) | 0.4 | Methyl ethyl ketone | | |
| 32 | (14) | 1.0 | (f) | 1.0 | 1,1,2-Trifluoro-trichloroethane Methyl ethyl ketone | 24 | 3 |
| 33 | (14) | 0.1 | (b) | 0.1 | 1,1,2-Trifluoro- | 11 | 3 |
| | | | (d) | 0.3 | Methyl ethyl ketone | | |
| 34 | (14) | 1.0 | (c) | 1.0 | 1,1,2-Trifluoro-trichloroethane Methyl ethyl ketone | 14 | 3 |
| 35 | (2) | 2.0 | — | — | 1,1,2-Trifluoro-trichloroethane Methyl ethyl ketone | 106 | 1 |
| 36 | (4) | 2.0 | — | — | 1,1,2-Trifluoro-trichloroethane Methyl ethyl ketone | 86 | 1 |
| 37 | (13) | 2.0 | — | — | Methyl ethyl ketone | 76 | 1 |
| 38 | (14) | 2.0 | — | — | Methyl ethyl ketone | 54 | 1 |
| Comp. Ex. No. | | | | | | | |
| 5 | — | — | (b) | 2.0 | 1,1,2-Trifluoro-trichloroethane | Broken | 0 |
| 6 | — | — | (d) | 2.0 | Toluene | 30 | 2 |
| 7 | — | — | (f) | 2.0 | 1,1,2-Trifluoro-trichloroethane | 67 | 1 |

We claim:
1. A process for imparting releasing property against one of synthetic resin, natural resin, rubber and formed product thereof to a mold which comprises applying to the mold a composition comprising:
(A) at least one of
(1) a fluorine-containing urethane compound represented by the formula

$$R_fXOCNHYNHCZ \quad (I)$$

wherein $R_f$ represents a perfluoroalkyl group having 4 to 20 carbon atoms, X represents a methylene group, $-CH_2CH(A)C_mH_{2m}-$ or $-SO_2N(R)C_tH_{2t}-$, A represents a hydrogen atom or hydroxyl group m is an integer of 0 to 4; and R represents a methyl or ethyl group, t is an integer of 1 to 4, Y represents a divalent group selected from the group consisting of;

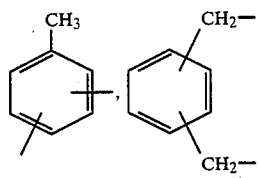

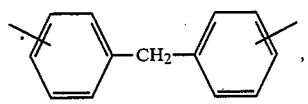

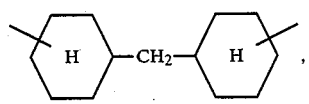

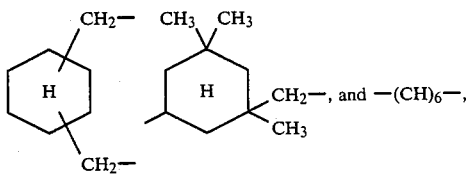

and Z represents a monohydric organic group which is a residue obtained by removing one hydrogen atom from a compound of the group consisting of;

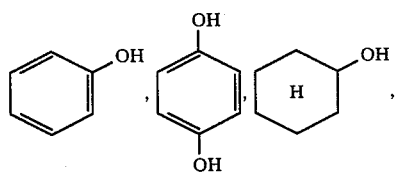

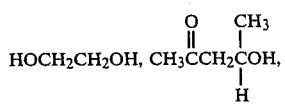

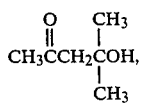

$C_nH_{2n+1}OH$ wherein n is an integer of 1 to 7, $C_nH_{2n+1}O(CH_2)_{n'}OH$ wherein n is an integer of 1 to 4 and n' is an integer of 2 to 4,

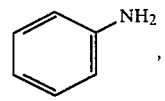

$C_nH_{n+1}NH_2$ wherein n is an integer of 1 to 3,

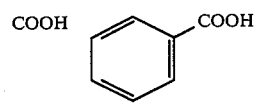

and $C_nH_{2n+1}COOH$ wherein n is an integer of 1 to 3,
(2) a fluorine-containing urethane compound represented by the formula

wherein $R_f$, X and Y are as defined above and W represents a divalent organic group which is a residue obtained by removing two hydrogen atoms from a compound selected from the group consisting of; $HO(CH_2)_kOH$ wherein k is an integer of 2 to 6, $HO(CH_2)_kNH_2$ wherein k is an integer of 2 to 6, $H_2N(CH_2)kNH_2$ wherein k in an integer of 2 to 6,

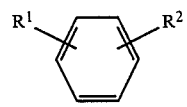

wherein $R^1$ and $R^2$ are the same or different and are each a hydroxyl group or amino group and

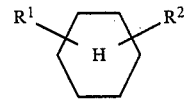

wherein $R^1$ and $R^2$ are as defined above, and
(3) a fluorine-containing urethane compound represented by the formula

wherein $R_f$, X and Y are as defined above, and
(B) at least one of members selected from the class consisting of silicone oil, a methyl silicone varnish, wax, and a highly fluorinated organic alkyl compound or amine compound.

2. The process for imparting a releasing property to a mold of claim 1 further comprising:
introducing into the mold to which the releasing composition has been applied, one of the following molding materials; synthetic resin, natural resin, and rubber;
molding the molding material into a molded product, and
releasing the molded product from the mold.

3. A mold release composition comprising:
(A) at least one of (1) a fluorine-containing urethane compound represented by the formula $$R_fXOCNHYNHCZ \quad (I)$$
  (with two C=O groups)

wherein $R_f$ represents a perfluoroalkyl group having 4 to 20 carbon atoms, X represents a methylene group, $-CH_2CH(A)C_mH_{2m}-$ or $-SO_2N(R)C_tH_{2t}-$, A represents a hydrogen atom or hydroxyl group, m is an integer of 0 to 4; and R represents a methyl or ethyl group, t is an integer of 1 to 4, Y represents a divalent group selected from the group consisting of:

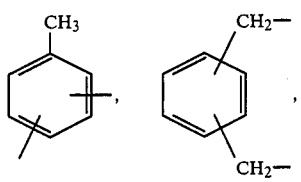

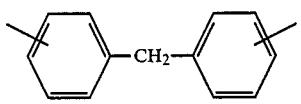

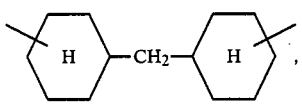

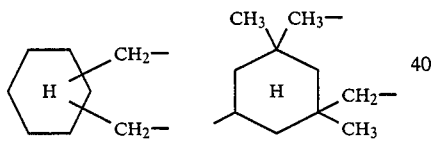

and $-(CH)_6-$;

and Z represents a monohydric organic group which is a residue obtained by removing one hydrogen atom from a compound of the group consisting of;

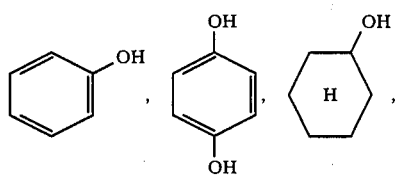

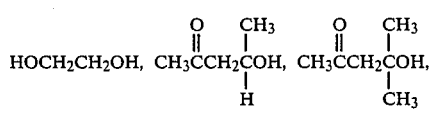

$C_nH_{2n+1}OH$ wherein n is an integer of 1 to 7, $C_nH_{2n+1}O(CH_2)_{n'}OH$ wherein n is an integer of 1 to 4 and n∝ is an integer of 2 to 4,

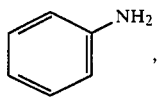

$C_nH_{n+1}NH_2$ wherien n is an integer of 1 to 3,

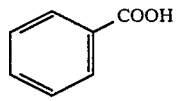

and $C_nH_{2n+1}COOH$ wherein n in an integer of 1 to 3,
  (2) a fluorine-containing urethane compound represented by the formula $$R_fXOCNHYNHCWCNHYNHCOXR_f \quad (III)$$

wherein $R_f$, X and Y are as defined above and W represents a divalent organic group which is a residue obtained by removing two hydrogen atoms from a compound selected from the group consisting of $HO(CH_2)_kOH$ wherein k is an integer of 2 to 6, $HO(CH_2)_kNH_2$ wherein k is an integer of 2 to 6, $H_2N(CH_2)_kNH_2$ wherein k is an integer of 2 to 6,

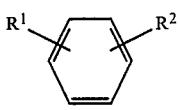

wherein $R^1$ and $R^2$ are the same or different and are each a hydroxyl group or amino group and

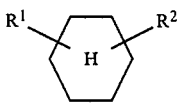

wherein $R^1$ and $R^2$ are as defined above, and
  (3) a fluorine-containing urethane compound represented by the formula $$R_fXOCNHYNHCNHYNHCOXR_f \quad (III)$$

wherein $R_f$, X and Y are as defined above, and
  (B) at least one of members selected from the class consisting of silicon oil, methyl silicon varnish, wax, and a highly fluorinated organic alkyl compound or amine compound.

4. The process of claim 1 for imparting a releasing property to a mold wherein the composition comprises 0.1 to 10 parts by weight of (B) per part by weight of (A).

5. The process of claim 1 for imparting a releasing property to a mold wherein the composition comprises 0.3 to 5 parts by weight of (B) per part by weight of (A).

6. The mold release composition of claim 3 comprising 0.1 to 10 parts by weight of (B) per part by weight of (A).

7. The mold release composition of claim 3 comprising 0.3 to 5 parts by weight of (B) per part by weight of (A).

* * * * *